United States Patent
Lewis et al.

[11] Patent Number: 5,773,723
[45] Date of Patent: Jun. 30, 1998

[54] FLOW TUBE LINER

[76] Inventors: Peter B. Lewis, 966 Longview Dr., North Attleboro, Mass. 02760; Richard A. Bertone, 251 Irondequoit Rd., Franklin, Mass. 02038; Richard W. Kalinoski, 64 Francis La., Little Compton, R.I. 02837; Michael R. Sheridan, 20 Hoffman Ave., Morgan, N.J. 08879

[21] Appl. No.: 535,986

[22] Filed: Sep. 29, 1995

[51] Int. Cl.⁶ ........................................... G01F 1/58
[52] U.S. Cl. ........................................ 73/861.12; 138/133
[58] Field of Search ........................... 73/861.11, 861.12, 73/861.14, 861.15; 131/109, 131, 133, 147, 178, DIG. 11

[56] References Cited

U.S. PATENT DOCUMENTS

| | | | |
|---|---|---|---|
| 2,783,173 | 2/1957 | Walker et al. | 154/83 |
| 3,153,779 | 10/1964 | Kass | 340/187 |
| 3,460,578 | 8/1969 | Schmid | 138/125 |
| 3,771,361 | 11/1973 | Reznick | 73/194 EM |
| 3,980,107 | 9/1976 | Barnes | 138/143 |
| 4,113,407 | 9/1978 | Grzina | 415/170 R |
| 4,297,895 | 11/1981 | Gryn | 73/861.12 |
| 4,329,879 | 5/1982 | Appel et al. | 73/861.12 |
| 4,388,834 | 6/1983 | Schmoock | 73/861.12 |
| 4,631,969 | 12/1986 | Schmoock | 73/861.12 |
| 5,062,305 | 11/1991 | Hansen et al. | 73/861.12 |

FOREIGN PATENT DOCUMENTS

| | | | |
|---|---|---|---|
| 0 045 646 | 2/1982 | European Pat. Off. | G01F 1/58 |
| 0 116 875 | 8/1984 | European Pat. Off. | G01F 1/58 |
| 59-198318 (A) | 3/1985 | Japan | G01F 1/58 |
| 0198318 | 4/1989 | Japan . | |
| 1153295 | 5/1969 | United Kingdom | H01R 9/18 |
| 1 221 963 | 2/1971 | United Kingdom . | |

Primary Examiner—George M. Dombroske
Assistant Examiner—Harshad Patel
Attorney, Agent, or Firm—Fish & Richardson P.C.

[57] ABSTRACT

A magnetic flowmeter has a tube for carrying fluid along a longitudinal axis. The tube has faces transverse to the longitudinal axis and disposed at opposite ends of the tube. A liner on the inner surface of the tube extends out from an end of the tube and into a recess on one face to anchor the liner in place.

28 Claims, 7 Drawing Sheets ns in the faces of the tube aids in holding the liner in place.

FLOW TUBE LINER

BACKGROUND OF THE INVENTION

This invention relates to flow tubes with liners.

Pipelines and other tubes carrying fluid sometimes include a plastic liner on their inner surface. These liners protect the tube's inner surface from being corroded by the fluid.

Electromagnetic flowmeters with flow tubes usually require such liners to ensure accurate flow measurement.

SUMMARY OF THE INVENTION

In general, in one aspect, the invention features a magnetic flowmeter having a tube for carrying fluid along a longitudinal axis. The tube has faces transverse to the longitudinal axis and disposed at opposite ends of the tube. A liner on the inner surface of the tube extends out from an end of the tube and into a recess on one face to anchor the liner in place.

Preferred embodiments of this aspect of the invention include the following features.

Each face has a circular dovetail recess that extends around the tube. The liner extends out from opposite ends of the tube and into the recess on each face.

The tube has at least one aperture for allowing an electrode to be inserted into the tube in a direction transverse to the longitudinal axis. The liner extends up into the aperture at a sufficient thickness to electrically insulate the electrode from the tube and to anchor the liner in place.

A grid is embedded in the liner, and the liner includes perfluoroalkoxy.

In general, in another aspect, the invention features an electromagnetic flowmeter with a tube for carrying fluid along a longitudinal axis. An aperture in a surface of the tube allows an electrode to be inserted into the tube in a direction transverse to the longitudinal axis of the tube. A liner is disposed on an inner surface of the tube and comprises a metal grid embedded in a plastic layer. The plastic layer and the metal grid have holes aligned with the aperture in the tube. The hole in the grid is larger than the hole in the layer so that a portion of the liner near the aperture has no embedded grid. A button electrode is inserted through the aperture and holes in the metal grid and layer to hold the portion of the liner against the metal tube.

Preferred embodiments of this aspect of the invention include the following features.

The grid is a metal perforated cylinder with a spiral seam and is welded to the tube at points on opposite ends of the tube. The grid is centered in the tube, and a portion of the layer interposed between the tube and the grid has a constant thickness.

The button electrode has a head with a face having serrations. The serrations are embedded in the portion of the liner to hold the liner in place. The layer also extends up into the aperture to hold the liner in place. As a result, the hole in the liner is smaller than the hole in the metal tube. The layer that extends up into the aperture is of sufficient thickness to electrically insulate the electrode from the tube.

In general, in another aspect, the invention features an electromagnetic flowmeter comprising a tube for carrying fluid. A liner disposed on an inner surface of the tube includes a perforated cylindrical metal grid embedded in a layer of material. The grid has holes in its surface such that lines connecting a center of each of three adjoining holes form an equilateral triangle.

Preferred embodiments of this aspect of the invention include the following features.

A wire is disposed on an outside surface of the grid and along a longitudinal axis of the grid. The wire provides a constant spacing between the grid and the inner surface of the tube. Several wires may be disposed parallel to one another on the outside of the cylinder in this manner.

A diameter of each hole is approximately $\frac{1}{8}$" and a distance between centers of the holes is approximately 0.188". Alternatively, the diameter is $\frac{1}{16}$" and the distance is 0.093".

Advantages of the invention include the following features.

The liner material is resistive to most chemicals and thus protects the inner surface of the tube from corrosion. The liner is also highly stable, i.e., it does not buckle, become loose, blister or crack between at least $-20°$ F. and $300°$ F. Thus even heating the liner to high temperatures, e.g., by routinely steam cleaning the tube, poses no hazard to the liner. The stable liner ensures that the inner diameter of the tube remains constant. This is particularly important when the tube is used in a magnetic flowmeter, where changes in the inner diameter of the tube may introduce errors into the flow measurement.

The stability of the liner is provided in part by the grid which rigidly shapes the liner. The grid's rigidity, and in particular, its resistance to compressive stress, is enhanced by its spiral structure and circular cross-section. The grid's spiral seam is welded tightly with no gaps to provide additional strength.

The grid is welded to the tube at several points to help fix the liner in place. The grid and liner provide complete (360° degree) coverage of the inner surface of the tube, and thus have no exposed edges or other weak points where the liner may buckle and separate from the inner surface of the tube.

The constant diameter grid is easily centered in the tube to provide a constant spacing between the grid and the inner surface of the tube. Liner material (e.g., plastic) can thus be injected through the grid to form a layer of constant thickness between the grid and the tube. This ensures that the grid is embedded firmly in the plastic at all points along the inner surface of the tube, and prevents the plastic from pulling away from the grid.

The circular holes in the grid are simple to manufacture and allow the plastic to easily flow through the grid during molding. In addition, the configuration of the holes (with centers placed on the corners of an equilateral triangle) permits a high concentration of holes per unit of surface area of the grid. This configuration, along with the described optimum size and spacing of the holes, allows the plastic to easily flow through the holes in the grid, without sacrificing the rigidity and strength of the grid.

The wire welded to the outside of the grid also aids in maintaining a constant spacing between the grid and the tube. The wire is disposed parallel to the axis of the tube to provide little friction when the grid is inserted in the tube. As a result, the wire is not likely to detach from the grid during assembly.

In addition to the grid, the liner is also held in place by a button electrode inserted through an aperture in the grid into the tube. Serrations on one side of the electrode are embedded into the liner to help hold the liner against the tube. The electrode thus provides support to the liner where the grid is cut away to form an aperture and is unable to provide direct support. Extending the liner into the aperture and recesses (or dovetails) on the ends of the tube also contributes to fixing the liner in place.

Other advantages and features of the invention will become evident from the following description and from the claims.

DESCRIPTION OF THE PREFERRED EMBODIMENTS

Figure 1:
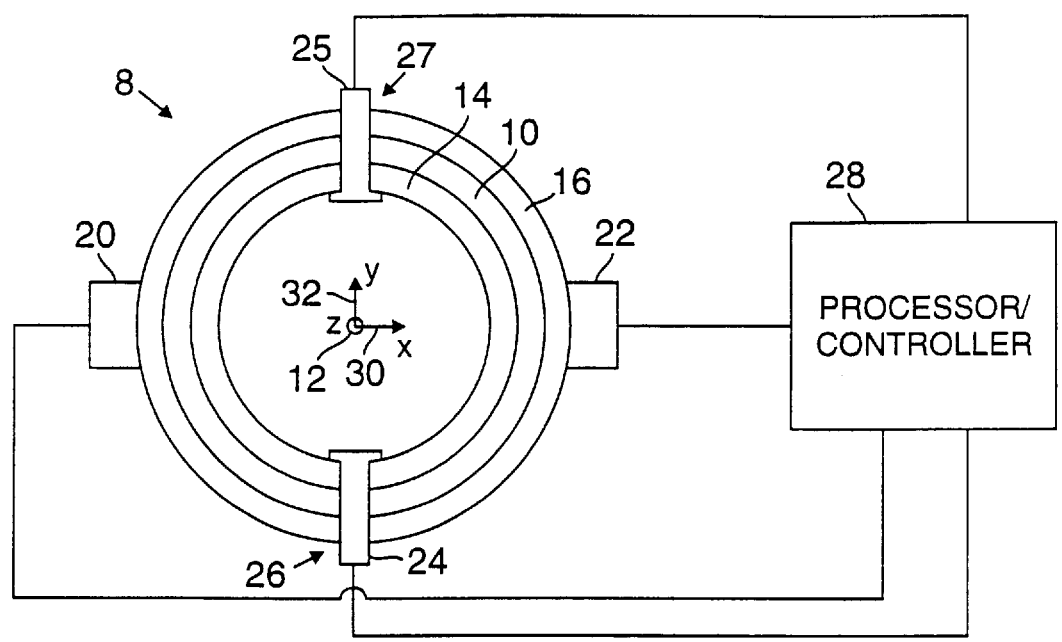
FIG. 1 is a schematic diagram showing a partial cross-sectional view of an electromagnetic flowmeter.

Referring to FIG. 1, an electromagnetic flowmeter 8 has a metal flow tube 10 for transporting fluid along a longitudinal axis (z axis 12). The metal tube is placed coaxially between a plastic liner 14 and a tubular housing 16.

Two magnetic coil assemblies 20, 22 are placed on opposite sides of the flowmeter, either on housing 16 as shown or in between the housing and metal tube 10. Two electrode assemblies 24, 25 are mounted in the metal tube through apertures 26, 27 in the housing, tube and plastic liner. Each electrode assembly is spaced from a coil assembly by 90 degrees along the circumference of the metal tube. Both electrode assemblies and coil assemblies are connected to a processor 28.

In use, processor 28 causes coil assemblies 20, 22 to produce a magnetic field inside the metal tube along x-axis 30, perpendicular to the direction of fluid flow. Housing 16 provides a magnetic return path for the magnetic field in the tube. Electrodes 24, 25 measure the resulting voltage in the fluid (directed along y-axis 32), and processor 28 converts the voltage measurement to a flow measurement. Liner 14 prevents the fluid from corroding the inner surface of the metal tube and thus producing errors in the electrode current measurement.

Figure 2:
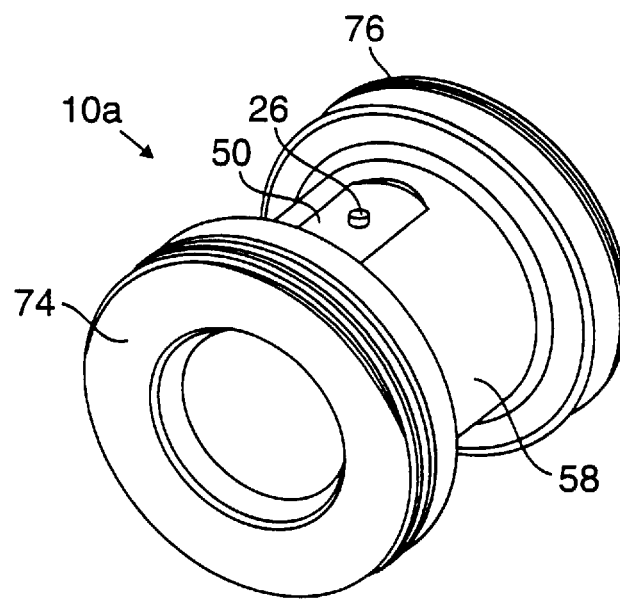
FIGS. 2 and 3 are perspective and front views, respectively, of a metal flow tube and liner in the flowmeter of FIG. 1.
Figure 3:
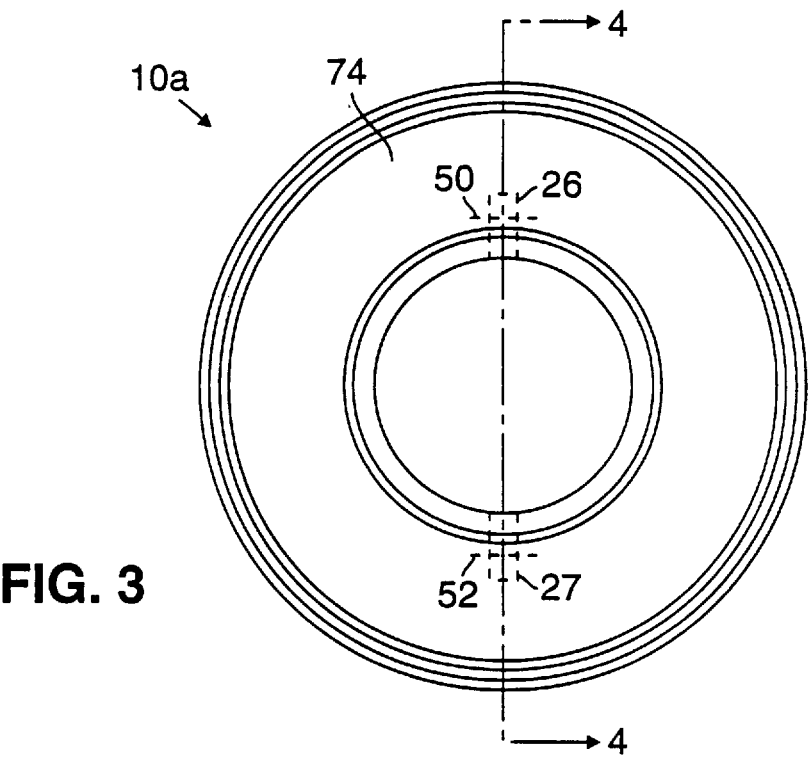
Figure 4:
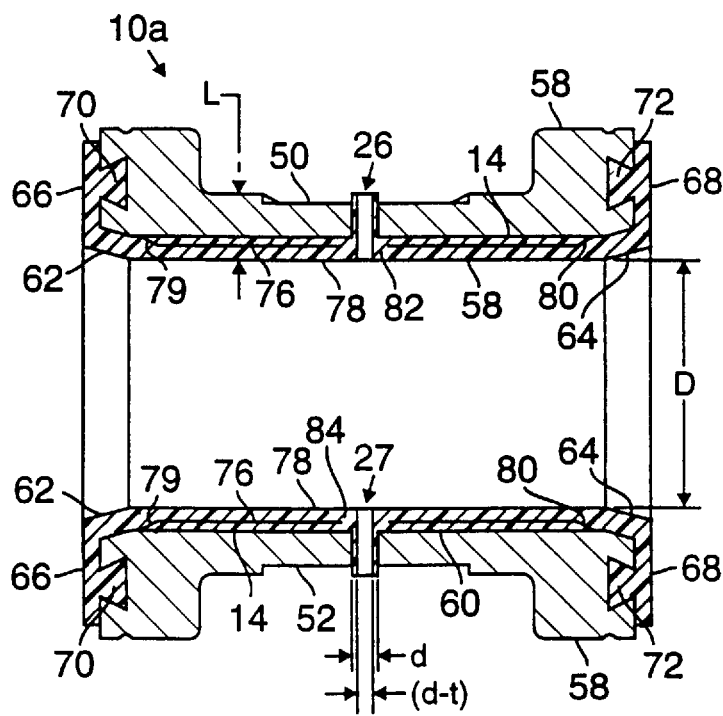
FIG. 4 is a cross-sectional view of the metal tube and liner, taken along line 4—4 of FIG. 3.

Referring to FIGS. 2 through 4, a wafer type metal tube 10a with a 1.5" inner diameter (D) has two opposite flat sections 50, 52 in its outer surface 58 for holding electrode assemblies 24, 25 (FIG. 1). Apertures 26, 27 connect the flat sections to the interior of the metal tube. A typical aperture is 0.150" in diameter (diameter d).

Outer surface 58 (FIG. 3) of metal tube 10a is covered by an insulator, e.g., 0.002" of PTFE, to prevent shorting to the housing 16 when the flowmeter is fully assembled.

Inner surface 60 of metal tube 10a has bevels 62, 64 at its two ends for allowing smoother fluid flow into and out of the tube. The ends of the tube are flared out to create faces 66, 68 with dovetails 70, 72. During use, the faces are connected to flanges 74, 75 (FIG. 2) which allow simple coupling of the tube to fluid carrying conduits.

Liner 14 is molded against inner surface 60 of the metal tube to provide 360 degrees of coverage (FIG. 1). The only gaps in the liner are aligned with apertures 26, 27 of the tube. Liner 14 also extends out from apertures 26, 27 (at a thickness t of about 0.03"), and around faces 66, 68 into dovetails 70, 72. Molding the liner into the holes and dovetails helps fix the liner relative to the metal tube.

Liner 14 contains a metal grid 76 embedded in a perfluoroalkoxy (PFA) layer 78. The grid ends before bevels 62, 64 on the tube, i.e., at about 0.25" from the ends of the tube. Each end 79, 80 of the metal grid near the bevels is flared out and welded to the metal tube at four separate points.

Apertures 82, 84 in the grid are aligned with apertures 26, 27 in metal tube 10a. When the electrodes are inserted into apertures 26, 27, apertures 82, 84 in the grid provide a clearance of 0.500" between the electrode and the grid.

Figure 5:
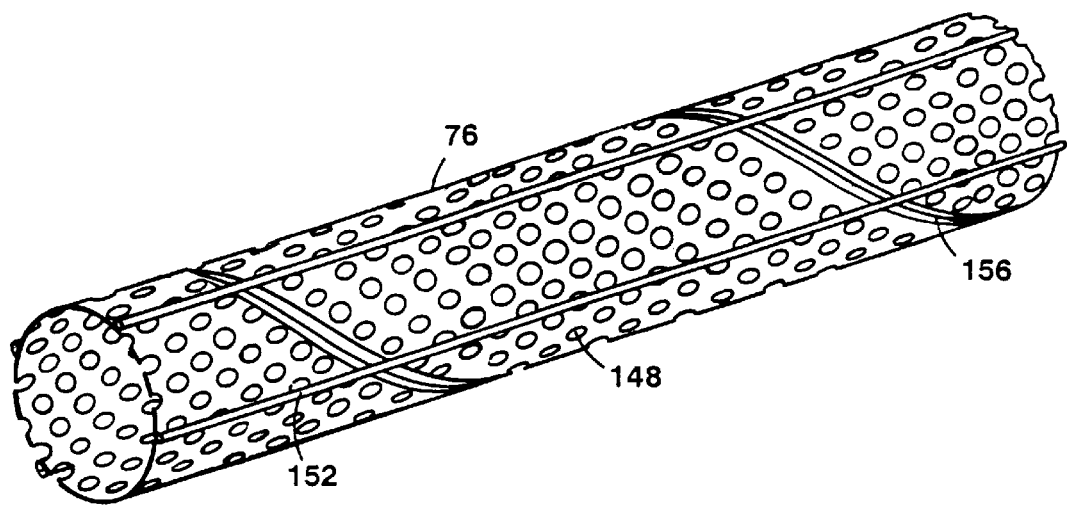
FIG. 5 is a perspective view of a perforated grid in the liner of FIG. 4.
Figure 6:
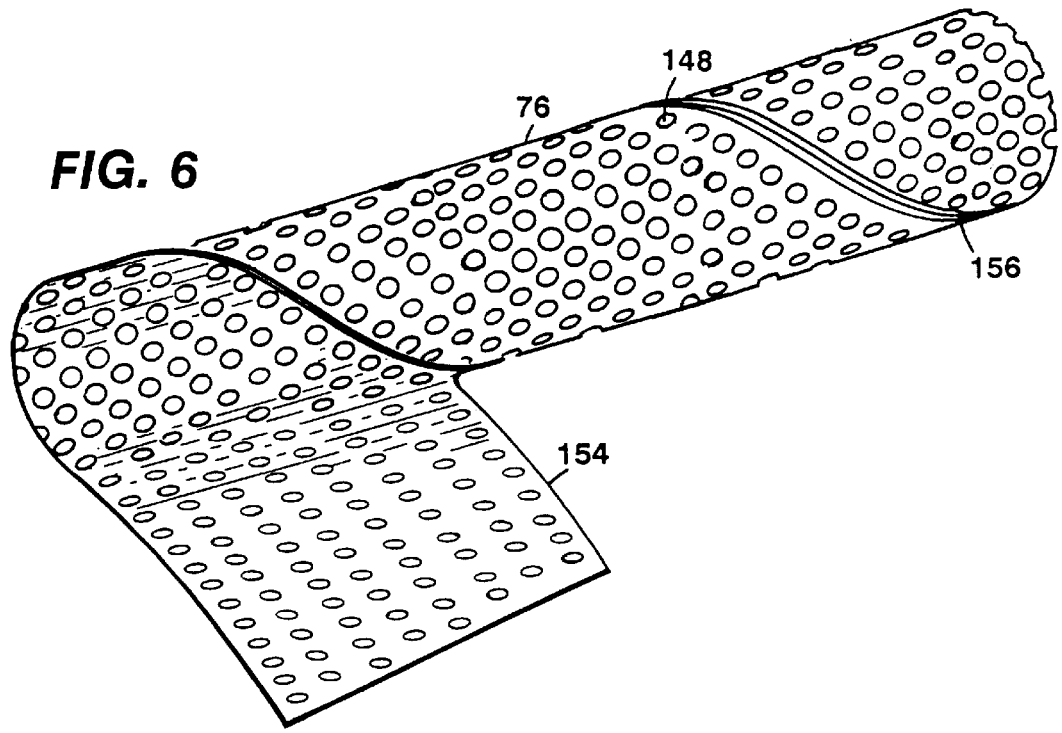
FIG. 6 is a perspective view of the grid of FIG. 5 in the process of formation.
Figure 7:
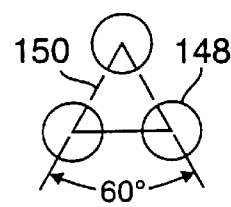
FIG. 7 is a schematic front view of adjoining perforations in a section of the surface of the grid of FIG. 5.

Referring to FIGS. 5 through 7, grid 76 includes a perforated cylinder of constant diameter. The cylinder is preferably formed from 304 annealed steel, with a magnetic permeability of less than or equal to 1.05 and a thickness great enough to support PTA layer 78. For example, steel 0.015" thick is adequate for liner 14 in metal tube 10a.

Holes 148 in the cylinder surface are arranged such that lines 150 drawn through the centers of the holes form an equilateral triangle, as indicated in FIG. 7. This is accomplished by staggering adjacent rows of holes in the surface of the cylinder. Holes 148 have a diameter of 0.125" and are spaced 0.188" apart, center to center.

Stainless steel wires 152 (FIG. 5) are welded to the outer surface of the cylinder along a longitudinal axis of the cylinder. The wires are spaced apart by about one inch along the cylinder's circumference and are each about 0.03 inch in diameter. The wires ensure that the grid is properly positioned with respect to the metal tube after assembly, as described in more detail below.

The cylinder is formed by twisting a strip of perforated stainless steel 154 into a spiral of constant diameter. Spiral seams 156 on the grids are welded together without leaving any gaps. Wires 152 are then welded onto the outside of the grid.

The plastic liner is mounted on the inside of metal tube 10a as follows. First, grid 76 is inserted in metal tube 10a and welded at opposite ends 79, 80 to the tube (FIG. 4). Wires 152 ensure that the inner wall of the tube and the outer surface of the grid have a constant spacing equal to the diameter of the wires.

PFA is next molded onto the inner surface of the tube to form PTA layer 78. A removable cylindrical mandrel (not shown) forms the other surface of the mold. The PFA flows through the holes in the grid to fill the space between the grid and the inner wall of the metal tube and to form a layer of constant thickness against the inner surface of the grid. The PFA also flows up out of apertures 26, 27, and around the faces of the tube into the dovetails 70, 72.

After molding, the plastic layer 78 and grid 76 together form a liner 14 with a constant thickness L of 0.120". The liner is in contact with the inner wall of the metal tube, while grid 76 is spaced 0.025" from the outer diameter of the liner.

Figure 8:
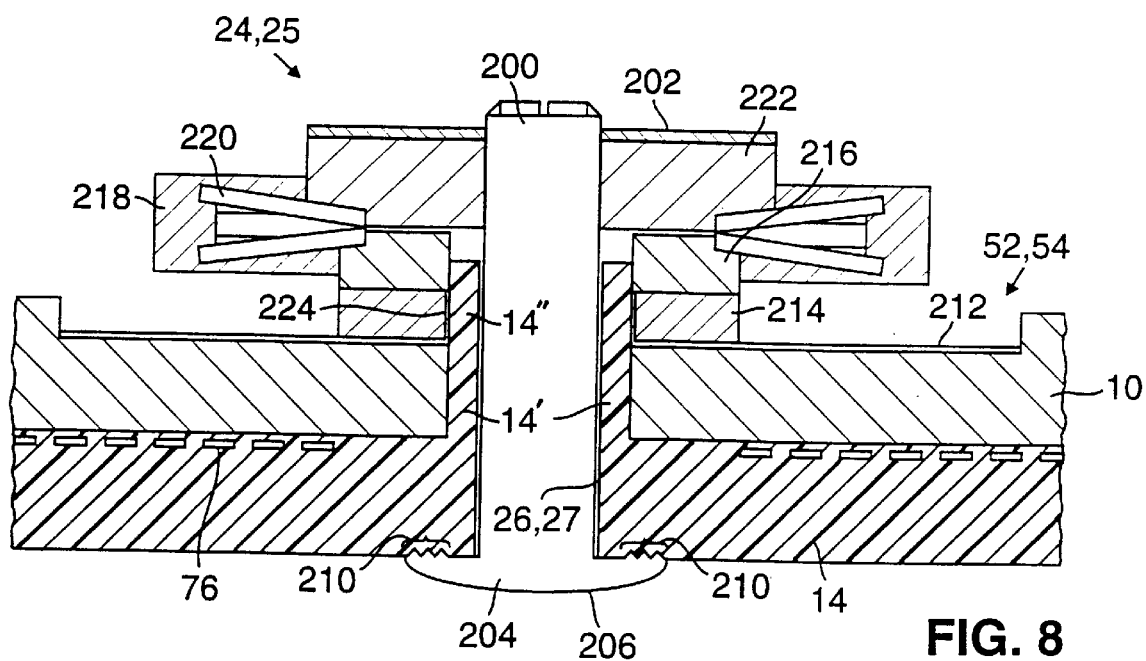
FIG. 8 is a partially cut-away side view of an electrode assembly in the flowmeter of FIGS. 1–4.

Referring to FIG. 8, each electrode assembly 24, 25 includes a button type electrode 200 connected to a lead assembly 202 at one end. The electrode has a head 204 at an opposite end with a face 206 for detecting current. An opposite face of the head has three serrations 210.

The electrode is placed in aperture 26 (27) with its head inside the metal tube. Face 206 is thus exposed to the process fluid when the tube is full, and serrations 210 protrude into the liner to help fix both the electrode and the liner in place. The portion 14' of liner 14 molded in the aperture separates electrode 200 from metal tube 10.

An insulating washer 212 is placed on flat section 50 (52) around the portion 14" of liner that extends out of aperture 26 (27). A ceramic washer 214 is placed on top of the insulating washer and around portion 14" of the liner. A third washer 216 is mounted on the insulating washer, and is surrounded by a ring 218 holding a circular Belleville spring 220 against washer 216. A nut adjustment 222 is placed partially on top of the insulating washer and spring. The electrode 200 and nut 222 have mating threads.

The electrode assembly is mounted on the metal tube by first placing electrode 24 (25) in aperture 26 (27) from the inside of the metal tube. The nut adjustment is then used to tighten the spring 220 and washers 212, 214, 216 against the upper end of the electrode. The head of the electrode is next pressed against the liner until the serrations dig into the liner by 0.025", e.g., by using a pneumatic tool. The nut adjustment mechanism is used again to tighten the washers and spring against the electrode and hold the electrode assembly in place.

The portion 14' of liner is usually sufficient to isolate the electrode from the metal tube. For additional insulation, a layer of silicon rubber 224 (e.g., RTV) is placed between ceramic washer 214 and portion 14" of the liner.

Figure 9:
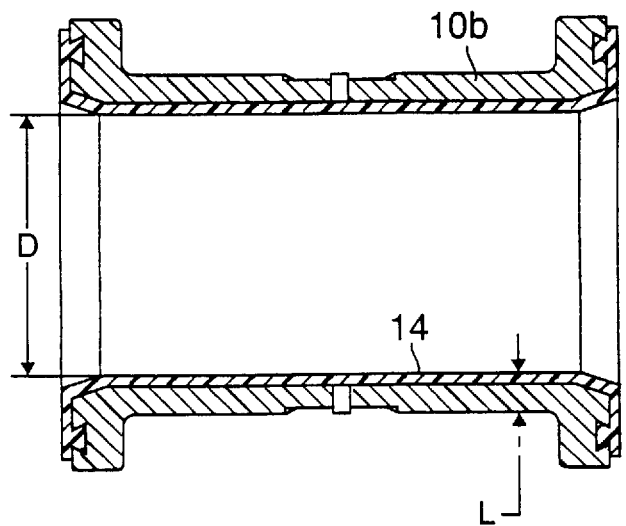
FIG. 9 is a sectional view of a metal tube and liner for another electromagnetic flowmeter.

Other embodiments are within the following claims. Referring to FIG. 9, for example, metal tube 10b is a wafer type tube with a larger inner diameter D and different liner specifications from tube 10a of FIGS. 2 through 4. Diameter D of tube 10b is approximately 3", and its grid is 0.030"thick with a clearance of 0.030" from the tube. The thickness (L) of the liner 14 in metal tube 10b is 0.150", and grid is recessed 0.38" in from the ends of the tube.

Figure 10:
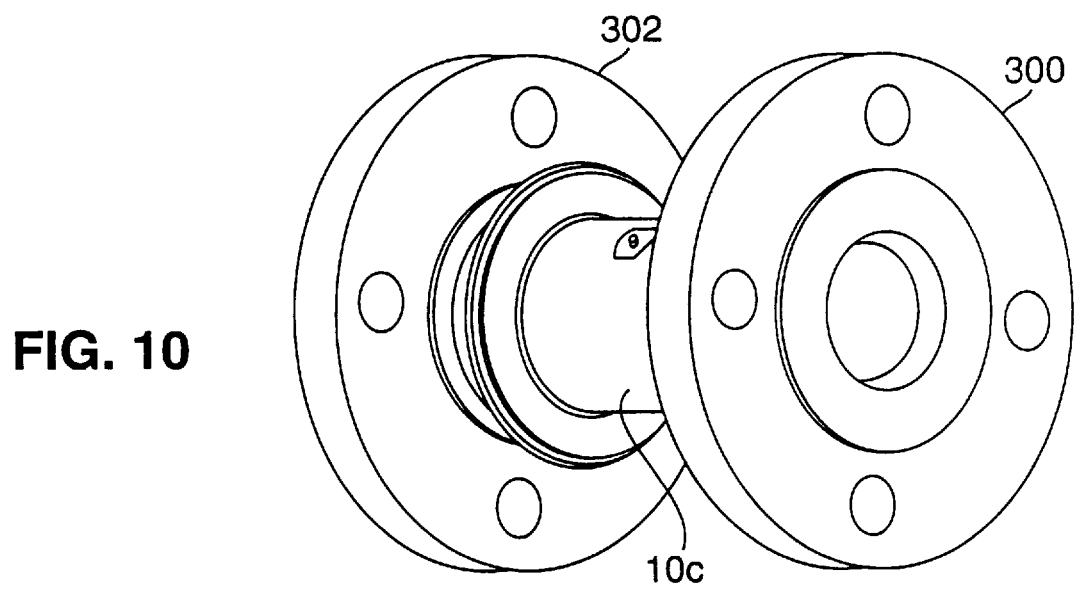
FIGS. 10 through 12 are perspective, front and sectional views, respectively, of another metal tube and liner, the sectional view being taken along line 12—12 of FIG. 11.
Figure 11:
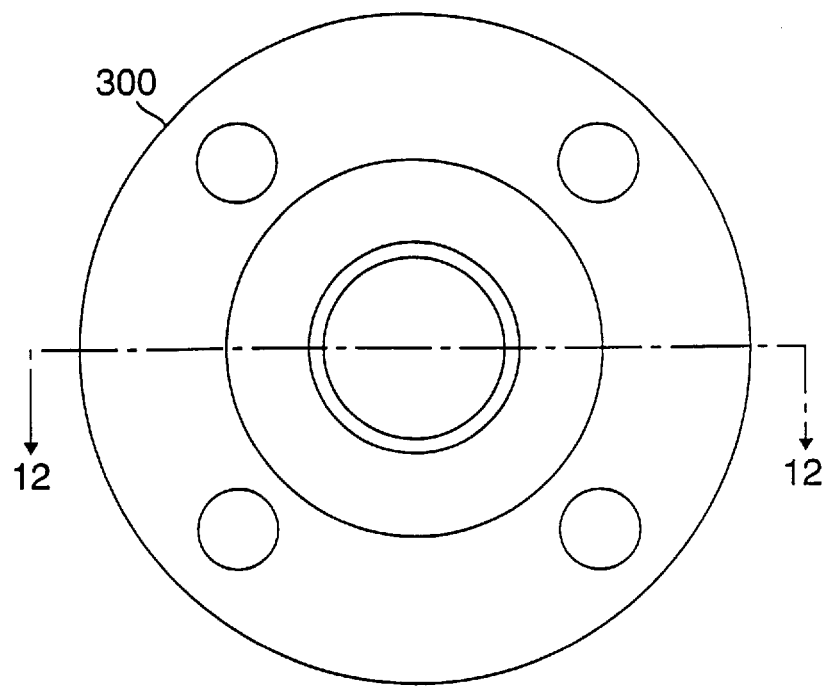
Figure 12:
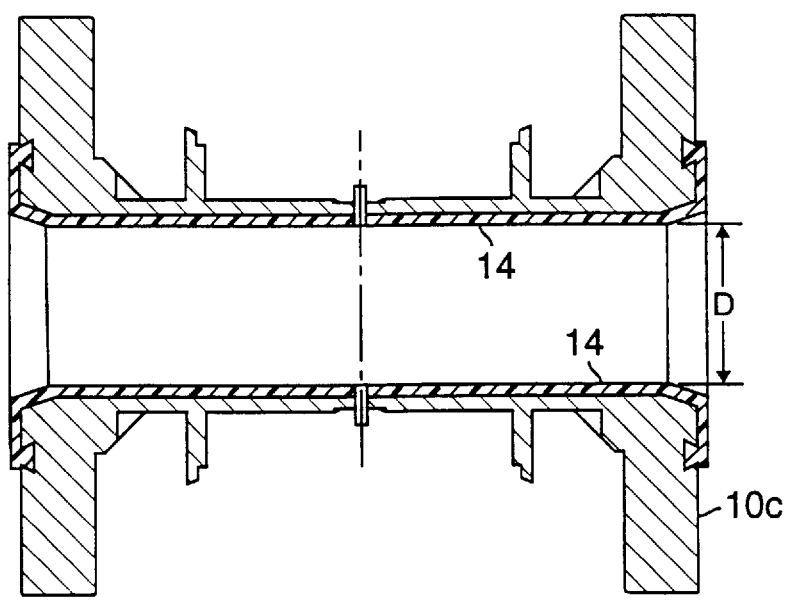

Another metal tube 10c has flanges 300, 302 welded onto the ends of the tube and an inner diameter D of approximately 2", as shown in FIGS. 10 through 12. Tube 10c has the same liner and grid specifications as the 3" metal tube of FIG. 9.

Figure 13:
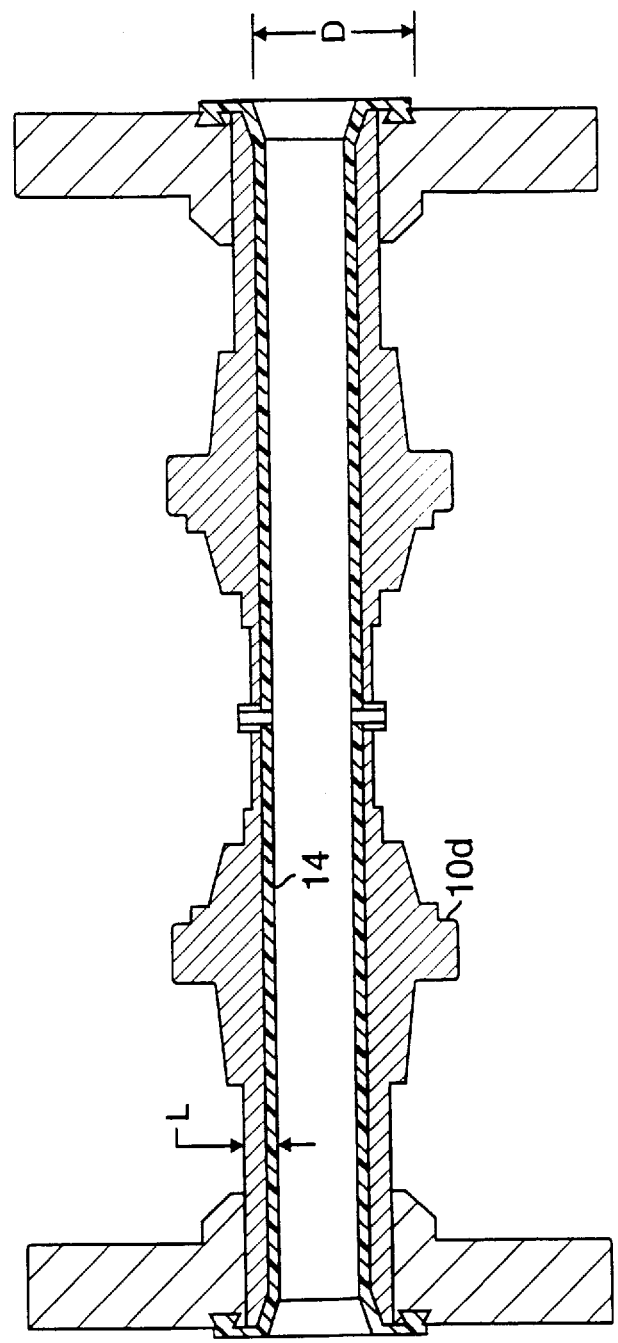
FIG. 13 is a sectional view of another metal tube and liner.

Referring to FIG. 13, tube 10d has an inner diameter of 0.5". The specifications of tube 10d differ from the 1.5" tube described above in that apertures 26, 27 in tube 10c provide a clearance of 0.450" between the grid and electrodes, and the thickness (L) of the liner 14 is 0.09". A diameter of each hole in the grid is 0.062" and a distance between the center of adjoining holes is 0.093".

Similarly, a tube 1" in inner diameter has the same liner specifications as the 0.5" tube, except the electrode clearance from the grid is 0.500". Tubes 4" and 6" in inner diameter are similar to the 3" tube of FIG. 3, except for having a grid thickness of 0.05" and a liner thickness of 0.170". Grid 76 in the 6" tube is recessed 0.68" from the ends of the tube.

Each metal tube described above is fitted with electrode assembly 24, 25, described in connection with FIG. 8.

What is claimed is:

1. A magnetic flowmeter comprising
   a tube having an inner surface defining a passage for carrying fluid along a longitudinal axis, the tube having faces transverse to the longitudinal axis and disposed at opposite upstream and downstream ends of the tube, at least one face having a recess spaced from the inner surface so that a portion of the face lies between the recess and the inner surface, and
   a liner disposed on the inner surface of the tube, the liner extending out from an end of the tube and into the recess on the face to anchor the liner in place.

2. The flowmeter of claim 1, wherein the recess comprises a circular recess formed in the face and extending around the tube.

3. The flowmeter of claim 1 wherein the recess comprises a dovetail.

4. The flowmeter of claim 1 wherein each face comprises a recess, the liner extending out from the tube at both ends and into each recess.

5. The flowmeter of claim 1 wherein the tube further comprises at least one aperture in a surface of the tube for allowing an electrode to be inserted into the tube in a direction transverse to the longitudinal axis, the liner extending up into the aperture to anchor the liner in place.

6. The flowmeter of claim 5 wherein the liner extending into the aperture is of sufficient thickness to electrically insulate the electrode from the tube.

7. The flowmeter of claim 1 further comprising a grid embedded in the liner.

8. The flowmeter of claim 1 wherein the liner comprises perfluoroalkoxy.

9. The flowmeter of claim 1, wherein the liner consists of a single layer.

10. An electromagnetic flowmeter, comprising
    a tube for carrying fluid along a longitudinal axis,
    an aperture in a surface of the tube for allowing an electrode to be inserted into the tube in a direction transverse to the longitudinal axis of the tube,
    a liner disposed on an inner surface of the tube, the liner comprising
      a plastic layer and
      a metal grid embedded in the plastic layer, the plastic layer and the metal grid having holes aligned with the aperture in the tube, the hole in the grid being larger than the hole in the plastic layer so that a portion of the liner near the aperture has no embedded grid, wherein the grid comprises a metal perforated cylinder having a spiral welding seam,
    a button electrode inserted through the aperture and holes in the metal grid and plastic layer, the button electrode holding the portion of the liner against the tube.

11. The flowmeter of claim 10, wherein the grid is centered in the tube, and a portion of the plastic layer interposed between the tube and the grid has a constant thickness.

12. The flowmeter of claim 10, wherein the grid is welded to a first region of the tube.

13. The flowmeter of claim 12, wherein the grid is welded to a second region of the tube, and said first and second regions are on opposite ends of the tube.

14. The flowmeter of claim 10, wherein the button electrode has a head with a face having serrations, the serrations being embedded in the portion of the liner to hold the liner in place.

15. The flowmeter of claim 10, wherein the layer extends up into the aperture to hold the liner in place, the hole in the liner being smaller than the hole in the tube.

16. The flowmeter of claim 15 wherein the layer that extends up into the aperture is of sufficient thickness to electrically insulate the electrode from the tube.

17. The flowmeter of claim 10 wherein the plastic layer comprises perfluoroalkoxy.

18. The flowmeter of claim 10 wherein the tube further comprises faces transverse to the longitudinal axis of the tube and disposed on opposite ends of the tube, at least one face having a recess, the layer extending out from an end of the tube and into the recess to anchor the liner.

19. The flowmeter of claim 18 wherein the recess comprises a dovetail.

20. An electromagnetic flowmeter comprising a tube for carrying fluid, a liner disposed on an inner surface of the tube, the liner comprising a layer of material, and a perforated cylindrical metal grid embedded in the layer, the grid having holes in its surface, wherein lines connecting a center of each of three adjoining holes form a substantially equilateral triangle.

21. The electromagnetic flowmeter of claim 20, further comprising a wire disposed on an outside surface of the grid and along a longitudinal axis of the grid, the wire providing a constant spacing between the grid and the inner surface of the tube.

22. The flowmeter of claim 21, further comprising a second wire disposed on the outside surface of the grid and parallel to the first wire.

23. The electromagnetic flowmeter of claim 20 wherein the grid has a spiral seam.

24. The electromagnetic flowmeter of claim 20, wherein the grid is welded to the tube at a point.

25. The flowmeter of claim 20, wherein a diameter of each hole is approximately 1/8" and a distance between centers of the holes is approximately 0.188".

26. The flowmeter of claim 20, wherein a diameter of each hole is approximately 1/16" and a distance between centers of the holes is approximately 0.093".

27. The flowmeter of claim 20 wherein a diameter of each hole is in the range of from about 1/16" to about 1/8" and the distance between centers of the holes is in the range of from about 0.09" to about 0.2".

28. An electromagnetic flowmeter comprising a tube for carrying fluid, a liner disposed on an inner surface of the tube, the liner comprising a layer of material, a perforated cylindrical metal grid embedded in the layer, the grid having holes in its surface, and a wire disposed on an outside surface of the grid and along a longitudinal axis of the grid, the wire providing a constant spacing between the grid and the inner surface of the tube.

* * * * *